Patented Mar. 16, 1948

2,437,939

UNITED STATES PATENT OFFICE 2,437,939

PROCESS FOR THE CLARIFICATION OF FERMENTED LIQUORS

Ralph T. K. Cornwell and Donald S. Porter, Fredericksburg, Va., assignors, by mesne assignments, to American Viscose Corporation, Wilmington, Del., a corporation of Delaware No Drawing. Application August 6, 1943, Serial No. 497,686

1 Claim. (Cl. 260—637)

The invention relates in general to the purification of fermented liquors, and in particular to a process for the purification of glycerol solutions produced by fermentation.

The process of the present invention is applicable for the purification of various fermented liquors but, for purposes of illustration only, the process will be described with respect to the purification of glycerol solutions produced by fermentation. While glycerol solutions of high clarity and free from impurities may be produced by the fermentation of colorless sugar solutions, molasses is a more economical source of sugar for this purpose. However, the fermentation of molasses solutions always results in a fermented liquor which contains a wide variety of impurities and by-products and has a pronounced dark color. The byproducts include volatile substances such as alcohol, acetone, acetic acid, and the like, while the impurities comprise pectins, unfermented sugar, cellulose, natural gums and resins, inorganic salts, especially salts of alkaline earth metals and iron and sulphates. The color of the solution obtained by the fermentation of molasses is due in part to organic colloids and in part to the presence of iron. It is apparent that the recovery of a substantially pure and colorless solution of glycerine from such a complex system involves numerous difficulties.

Heretofore it has been suggested to remove the water and volatile organic compounds from the fermented liquor by evaporation, and to separate the water-soluble compounds from the organic colloids by dialysis as through a semi-permeable membrane formed by regenerated cellulose. However, the diffusate obtained by such dialysis still has a dark brown color which is objectionable when the glycerol is to be used as a softening agent for transparent materials, paper, and in cosmetics, pharmaceuticals, and plastics.

Accordingly, it is generally the object of the present invention to provide a method for the production of substantially clear and colorless solutions from fermentation liquors.

It is a specific object of the present invention to provide a process for the recovery of a substantially clear and colorless solution of glycerol from the liquor produced by the fermentation of molasses.

It is a further specific object to remove from fermentation glycerol solutions such inorganic impurities as calcium, iron, and sulphates.

It is another specific object to reduce the color of glycerol solutions produced by fermentation so that the solution is adapted for use as a softening agent for transparent sheeting and in pharmaceuticals.

Further objects of the invention will in part be obvious and will in part appear hereinafter.

According to the present invention there is provided a process for the purification of fermented liquors including the steps of treating a fermented liquor to precipitate iron as iron sulfide, dialyzing the liquor, treating the liquor to precipitate sulphates therefrom, treating the resulting liquor to precipitate alkaline earth metals therefrom, and decolorizing the liquor by contacting it with an absorbent material. In the preferred embodiment these steps are carried out in the following sequence: treating the fermented liquor to precipitate iron as iron sulfide, dialyzing the treated liquor, treating the diffusate to precipitate sulphates therefrom, thereafter treating the resulting liquor to precipitate alkaline earth metals therefrom, and decolorizing the filtrate with an absorbent material. After such clarification the clarified liquid may be filtered and concentrated if desired.

The invention accordingly comprises a process having the steps and relation of steps one to another all as set forth in the following detailed description and the scope of the application of which will be indicated in the claim.

The present process is adapted for the clarification of fermented liquors of all types but it is especially adapted for the clarification of liquors resulting from the fermentation of carbohydrates, this term being used to include cellulose, starches and sugars. Thus, the present process may be used for the purification of fermented liquors resulting from the production of such substances as glycerol, the glycols, in particular 2-3-butylene glycol, higher alcohols, polyhydric alcohols, and various organic acids, such, for example, as citric, lactic, fumaric, tartaric, oxalic, and the like. In the production of such substances by fermentation of natural occurring carbohydrates, the fermented liquor will contain a wide variety of by-products and impurities and has a pronounced dark color. The by-products frequently include volatile substances, such as alcohol, acetone, acetic acid and the like, while the impurities usually comprise pectins, unfermented sugar, cellulose, natural gums, and inorganic salts, especially salts of alkaline earth metals and of iron; and also substantial quantities of sulphates. The dark color of a liquor resulting from the fermentation of a natural-occurring carbohydrate is due in part to the organic colloids present and in part to the presence of iron. The present invention provides a process for the production of substantially pure and colorless solutions from such fermented liquors.

In the following detailed description a process will be described with reference to the purification of glycerine solutions obtained by fermentation of molasses, but it is to be understood that the invention is not limited to the purification of such liquors.

In general, the fermented liquor is subjected to certain preliminary treatments prior to being subjected to the essential purifying and clarifying steps of the present process. Normally, it will be desirable to evaporate from the liquor the volatile organic substances, such as alcohol, acetone, acetic acid, and the like. This is normally carried out by distillation in copper stills. Since ammonia is frequently produced during such distillation, it is customary to acidify the fermenting liquor and to maintain it acid during the distillation. Therefore the residue, after distillation, should be neutralized with any suitable alkaline compound, such, for example, as lime, sodium hydroxide, potassium bicarbonate, and the like and then concentrated until the liquor is concentrated to about 50% of its volume. Such concentration reduces the volume of liquid to be treated by the subsequent purification process. The fermented liquor, after such concentration, is heated and there is added an aqueous solution of a water-soluble sulfide such as ammonium, sodium, potassium, calcium and strontium sulfides, hydrogen sulfide, and the like, in sufficient concentration to precipitate the iron as ferrous sulfide. The iron appears to be one of the chief causes of the dark color of the solution. The removal of the iron prior to the step of dialysis eliminates subsequent filtration.

After precipitation of the iron, the solution is dialyzed through a semi-permeable membrane, the precipitated iron sulfide being retained by the membrane. For the dialysis membrane there may be employed parchment paper or a hydrophilic pellicle, such, for example, as regenerated cellulose produced from viscose or by the denitration of nitrocellulose, or from cuprammonia solutions of cellulose. In the now preferred embodiment the dialysis membrane is a tube of regenerated cellulose. The process of dialysis may be carried out in the apparatus and according to the procedure described in the copending applications Serial Nos. 493,918, now Patent No. 2,411,238, Nov. 19, 1946, and 493,919, now Patent No. 2,411,239, Nov. 19, 1946, both filed July 8, 1943.

By the dialysis the glycerol and other water-soluble substances are separated from the organic colloids. The diffusate thus obtained is next treated to remove sulfate ion, with an aqueous solution of a water-soluble salt of an alkaline earth metal such, for example, as calcium, barium, strontium chlorides, acetates, nitrates, and the like, to precipitate the sulphates of the alkaline earth metal. Before filtering, the diffusate is first acidified, as with acetic acid, and then treated with a water-soluble salt which will cause the precipitation of the alkaline earth metal. Suitable salts are carbonates, oxalates, orthophosphates and tartrates of ammonium, potassium, sodium, and lithium.

The solution thus obtained is filtered and the filtrate is treated to remove color with activated carbon silica gel or other absorbent for a period of about one hour at an elevated temperature. For example, with activated carbon, the treatment is carried out at a temperature from 40 to 100° C., preferably 80° C., while the solution is slightly acid. The activated carbon appears to remove most of the residual color due to organic substances. The clarified solution thus obtained is filtered to recover the spent carbon. The spent carbon may be reactivated by heating in a conventional manner and then reused.

The filtrate thus obtained is neutralized, then passed in vacuum evaporators in which the solution may be concentrated as desired. The solution is neutralized by use of a dilute solution of a water-soluble alkaline compound such, for example, as the hydroxides, carbonates and acetates of the alkali metals, or by ammonia. The concentration of the clarified solution must be carried out under vacuum and at a relatively low temperature to prevent any additional discoloration which results when the solution is heated to the boiling point at atmospheric pressure. After the concentrated solution is allowed to stand or cools down, salts, such as potassium sulfate and potassium chloride, precipitate and may be removed by filtration. The separated salts are allowed to settle and the solution decanted and filtered if necessary.

The solution thus obtained is substantially free of iron and alkaline earth metal salts and of sulphates. It is characterized by being substantially clear and colorless, depending upon the extent of decolorizing. The glycerine solution thus obtained is sufficiently clear and colorless to be employed as a softening agent for transparent materials such as Cellophane, gelatin, casein and papers of all kinds, including glassine paper, leather, cosmetics and pharmaceuticals, and in the manufacture of synthetic resins.

By way of illustration but not by way of limiting the invention, there will be given the following specific example:

A liquor resulting from the fermentation of molasses in an alkaline medium for the production of glycerol is rendered slightly acid and the alcohol and acetone distilled off in a copper still. The residue is then concentrated to about 50% of its initial volume and then neutralized with a 10% aqueous solution of potassium bicarbonate. The concentrated liquid is then heated and there is added, with stirring, a 20% aqueous solution of calcium sulfide which precipitates the iron as iron sulfide. Without filtering the solution, the liquid is decanted from the precipitate and dialyzed with water through a regenerated cellulose tube in a multitube dialyzer according to the procedure described in the co-pending application Serial No. 493,919, now Patent No. 2,411,239, Nov. 19, 1946, filed July 8, 1943. The diffusate is a dilute solution of glycerol having a dark brown color due to organic coloring matter. The diffusate is then treated with a 10% aqueous solution of barium acetate to precipitate sulphate ions as barium sulphate. The solution is then acidified with 10% aqueous solution of acetic acid to a pH 6 and then treated with a 10% aqueous solution of oxalic acid to precipitate barium and calcium ions as the oxalates. The solution is then filtered and the filtrate is treated with a mass of activated carbon for one hour at a temperature of 80° C., as a result of which the dark color is substantially removed. The substantially colorless solution is then filtered to remove the spent carbon which may be reactivated and reused. The filtrate is then concentrated in vacuum evaporators at room temperature. During such concentration some potassium sulphate and potassium chloride precipitates and is removed by an additional filtration.

It is to be understood that the invention is not limited to a process in which the sequence of steps is that given in the above description since it is possible, without transcending the scope of the invention to carry out the steps of the process in a different order. For example, the decolorizing of the solution by means of an absorbent material, e. g. activated carbon, can be carried out at an earlier stage in the process conveniently immediately after the dialyzing step. Since the dialyzing operation removes some of the color, it is not advantageous to decolorize prior to dialyzing. On the other hand, the precipitation of the iron and of the sulphate ions may occur in reverse order from that given.

Having described our invention, what we claim as new and desire to secure by Letters Patent is:

A process for the purification of fermented liquors comprising the steps of treating a fermented liquor with a water-soluble sulfide to precipitate iron as iron sulfide, dialyzing the liquor, treating the diffusate with a water-soluble salt of an alkaline earth metal to precipitate sulphates therefrom thereafter making the diffusate acidic and then treating the diffusate with oxalic acid to precipitate alkaline earth metals therefrom, decolorizing the diffusate by contacting it with an absorbent material, and filtering the purified diffusate.

RALPH T. K. CORNWELL.
DONALD S. PORTER.

REFERENCES CITED

The following references are of record in the file of this patent:

UNITED STATES PATENTS

| Number | Name | Date |
| --- | --- | --- |
| 1,344,850 | Bassett | June 29, 1920 |
| 1,357,138 | Bassett | Oct. 26, 1920 |
| 1,936,497 | Carothers et al. | Nov. 21, 1933 |
| 2,225,024 | Weber | Dec. 17, 1940 |

FOREIGN PATENTS

| Number | Country | Date |
| --- | --- | --- |
| 3,138 | Great Britain | July 19, 1881 |
| 323,373 | France | Mar. 4, 1903 |
| 1,398 | France | July 22, 1903 |
| | (Addition to 323,373) | |